(12) United States Patent
Sherlock et al.

(10) Patent No.: US 6,452,155 B1
(45) Date of Patent: Sep. 17, 2002

(54) OBSTRUCTION DETECTION SYSTEM AND METHOD HAVING AN ALTERNATING SIGNAL REPRESENTATIVE OF A VELOCITY OF AN OBJECT

(75) Inventors: Daniel J. Sherlock, Fullerton; Robert W. Preston, Redlands, both of CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 88 days.

(21) Appl. No.: 09/672,344

(22) Filed: Sep. 28, 2000

(51) Int. Cl.[7] .............................................. H01J 40/14
(52) U.S. Cl. ..................... 250/221; 250/559.4
(58) Field of Search .............................. 250/221, 222.1, 250/559.4; 340/555–557; 319/563, 626, 35, 55, 65

(56) References Cited

U.S. PATENT DOCUMENTS 5,811,791 A * 9/1998 Portman ..................... 250/221

OTHER PUBLICATIONS

Co–pending patent application Docket No. 99PS016/KE entitled "Position Detection Of Deployable Display Using Optical Encoder" filed on an even date, inventor D. J. Sherlock et al. (U.S. Appl. No. 09/672, 353, filed Sep. 28, 2000, pending.)

* cited by examiner

Primary Examiner—Que T. Le
(74) Attorney, Agent, or Firm—Nathan O. Jensen; Kyle Eppele

(57) ABSTRACT

A system for detecting an obstruction in the deploy path of a retractable LCD monitor includes a disc that rotates with the monitor as the monitor is deployed, an optical switch operatively coupled to the disc to generate pulses indicating the speed at which the monitor is deploying, and a retriggerable one-shot circuit that receives the pulses from the optical switch. When the pulses fail to arrive at the retriggerable one-shot circuit fast enough, i.e., below a threshold rate, the retriggerable one-shot circuit times out and its output state transitions from a high level to a low level. The high-to-low state transition causes the monitor to retract and re-attempt deployment.

23 Claims, 4 Drawing Sheets

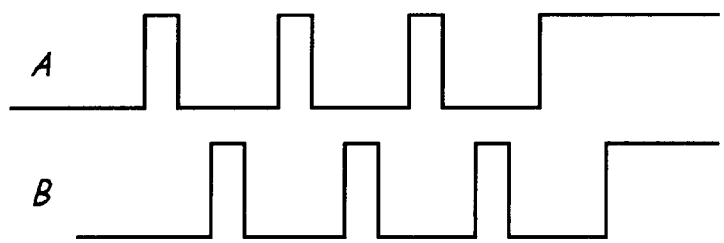
*FIG. 6A*
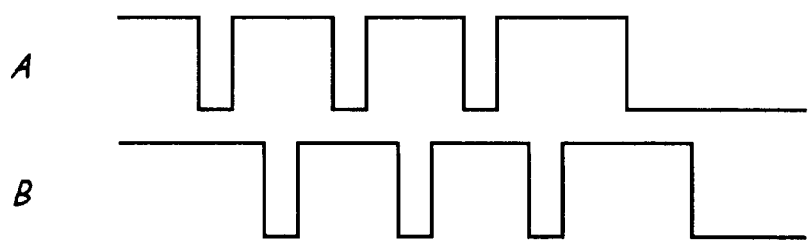
*FIG. 6B*
*FIG. 8*
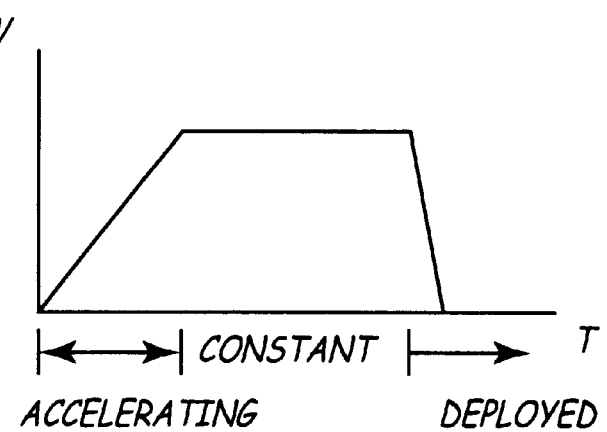

OBSTRUCTION DETECTION SYSTEM AND METHOD HAVING AN ALTERNATING SIGNAL REPRESENTATIVE OF A VELOCITY OF AN OBJECT

REFERENCE TO RELATED APPLICATION

This application is related to, and being filed concurrently with, an application by Daniel J. Sherlock et al., entitled "Position Detection of Deployable Display Using Optical Encoder."

BACKGROUND OF THE INVENTION

1. Field of the Invention

The invention relates generally to an obstruction detection system and method and, more particularly, to a system and method of detecting obstructions in the deploy path of a retractable liquid crystal display (LCD) monitor.

2. Description of the Related Art

A rectractable LCD monitor 10, illustrated in FIG. 1, is employed in many in-flight entertainment (IFE) systems. It is typically mounted underneath an overhead compartment area 20 and has two standard positions—the stowed (inoperative) position 31 and the deployed (operative) position 32. While in the stowed position, the monitor is received in a recess provided underneath the overhead compartment area 20 and is held in that position against gravity by a latch 21. The deployed position of the monitor extends slightly past the vertical axis 41 to provide a more comfortable viewing angle to the passengers, which is indicated by a set of arrows labeled 42. While in the deployed position, an electromechanical brake (not shown) is typically used to hold the monitor in that position against a rubber bumper 22.

As shown in FIG. 2, the monitor is moved from its stowed position to its deployed position by a motor shaft 14 that is rotatably driven by a motor 15. The motor 15 is under the control of a motor control circuit 16. The motor control circuit 16 commands the motor 15 to rotate the motor shaft 14 in the forward direction (FWD) so as to move the monitor from its stowed position to its deployed position at a prescribed deploy velocity $\omega$. The deploy velocity has a prescribed upper limit which is equal to a rotational velocity of the monitor that would impart a maximum force, typically with a value of about of 6.5 pounds. Further, if an obstruction is present in the path of the monitor while the monitor is being moved to its deployed position, i.e. during the deploy path, so that the monitor encounters a force of typically 4.5 to 6.5 pounds, the monitor is required at that time to return to its stowed position, i.e., retract, and re-attempt deployment thereafter. Monitor deployment is attempted typically three times and if still unsuccessful after three attempts, the monitor remains in the stowed position until the unit is commanded on again.

In the conventional system, the obstruction is assumed to be present in the path of the monitor in one of two ways. In the first approach, the current through the motor is sensed and if there is an unacceptable increase in the current through the motor, the monitor is returned to its stowed position and monitor deployment is re-attempted. However, this approach is difficult to achieve consistently with temperature changes and over the life of the unit due to changes in the internal friction in the drive mechanism. Further, this approach often requires a separate calibration of the threshold current for each monitor on an aircraft because the current requirements for the motor to move the monitor at the prescribed deploy velocity are likely to be different for each monitor as the internal friction in the drive mechanism invariably differs from unit to unit.

In the second approach, the monitor is allotted a fixed period of time to deploy. If it fails to reach the deployed position within the allotted time, the monitor is returned to its stowed position and monitor deployment is re-attempted. However, with this approach, the monitor will continually press against the obstacle that is keeping it from deploying until the allotted time expires. This is undesirable especially when the obstacle is the passenger's head.

SUMMARY OF THE INVENTION

An object of the invention is to provide an obstruction detection system and method for a retractable LCD monitor, which exhibits a greater degree of repeatability in setting the monitor to retract when encountering an obstruction.

The above and other objects of the invention are achieved with an optical sensor or switch that generate pulses indicating the speed at which the monitor is moving toward the deployed position and a retriggerable monostable multivibrator (also called "a retriggerable one-shot"). The retriggerable one-shot receives the pulses and when the pulses fail to arrive fast enough, i.e., below a threshold rate, the retriggerable one-shot times out and its output state transitions from a high level to a low level. The high-to-low state transition causes the monitor to retract and re-attempt deployment.

The invention provides greater repeatability because the variable that is sensed and monitored over time is the deploy speed of the monitor. Based on this data and a time reference, the force applied by an obstruction in the deploy path can be derived and when this force exceeds a certain value, the monitor is commanded to retract. As a result, the conditions under which retraction should occur can be determined from the deploy speed data of the monitor, irregardless of the other variables that the conventional system needed to take into account, in particular the surrounding temperature and the internal friction of the drive mechanism. Further, the invention employs digital circuitry which is more stable over life and environmental changes than analog circuitry that is used to sense motor current. As a result, the invention provides the potential for an adjustment-free design, and reduces the need to readjust units in the field.

Additional objects, features and advantages of the invention will be set forth in the description of preferred embodiments which follows.

BRIEF DESCRIPTION OF THE DRAWINGS

The invention is described in detail herein with reference to the drawings in which:

FIG. 6A is a timing diagram of the pulses that are derived from the output of the optical switch of FIG. 5;

FIG. 6B is an alternate timing diagram of pulses that are derived from the output of the optical switch of FIG. 5, that are inverted with respect to the timing diagram of FIG. 6A;

FIG. 8 is a velocity profile of the retractable LCD monitor implementing the obstruction detection system according to an embodiment of the invention.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 3:
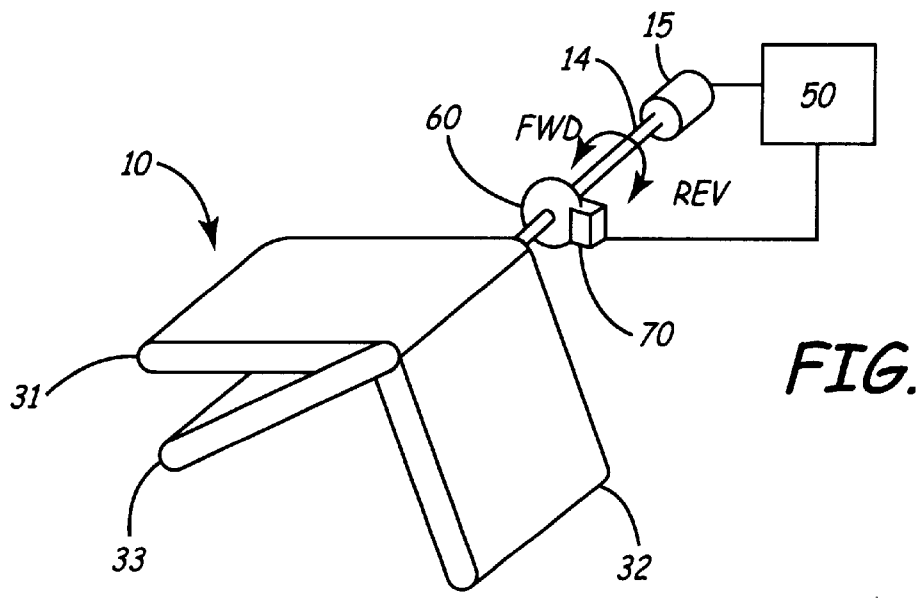
FIG. 3 illustrates a retractable LCD monitor implementing an obstruction detection system according to an embodiment of the invention.

An obstruction detection system for a rectractable LCD monitor 10 according to an exemplary embodiment of the invention is illustrated in FIG. 3. In the exemplary embodiment, the monitor 10 and the obstruction detection system are employed in an IFE system. However, the invention may be employed in other various applications, e.g., passenger entertainment systems for trains, buses, jetfoils, and other mass transportation vehicles, an automobile display system having a retractable monitor, a personal display system where a retractable monitor is mounted under a countertop, cabinet, or other furniture to save space, etc. Further, the invention is not limited to LCD monitors but may be applied to plasma displays, other flat panel displays, and more broadly any panels that deploy and retract.

Figure 1:
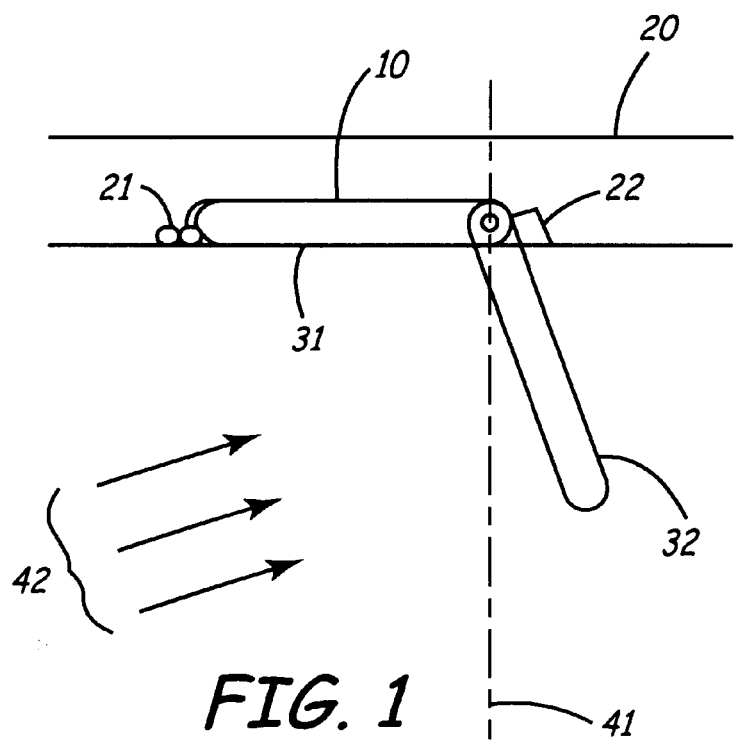
FIG. 1 illustrates the general environment in which a retractable LCD monitor is implemented.
Figure 2:
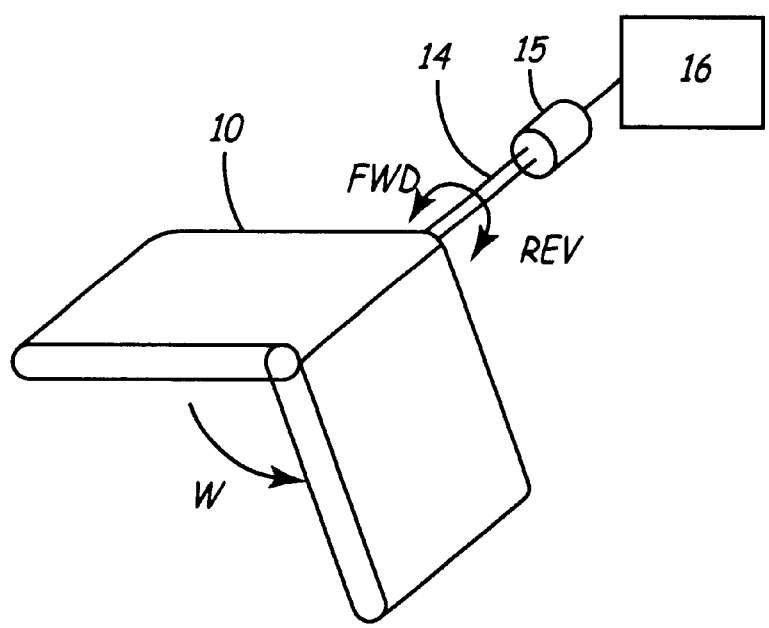
FIG. 2 illustrates a conventional retractable LCD monitor.

The monitor 10 of FIG. 3 is to be mounted underneath an overhead compartment area 20 of an aircraft, as shown in FIG. 1. Three positions are shown in FIG. 3—the stowed (inoperative) position 31, the deployed (operative) position 32, and the intermediate position 33. While in the stowed position, the monitor is received in a recess provided underneath the overhead compartment area and is held in that position against gravity by a latch 21. The latch 21 is typically a solenoid latch but may be a mechanical latch. If a solenoid latch is used, it is released when deployment of the monitor is commenced. The deployed position of the monitor extends slightly past the vertical axis 41 to provide a more comfortable viewing angle to the passengers, and while in that position, the monitor is held against a rubber bumper 22.

Figure 7:
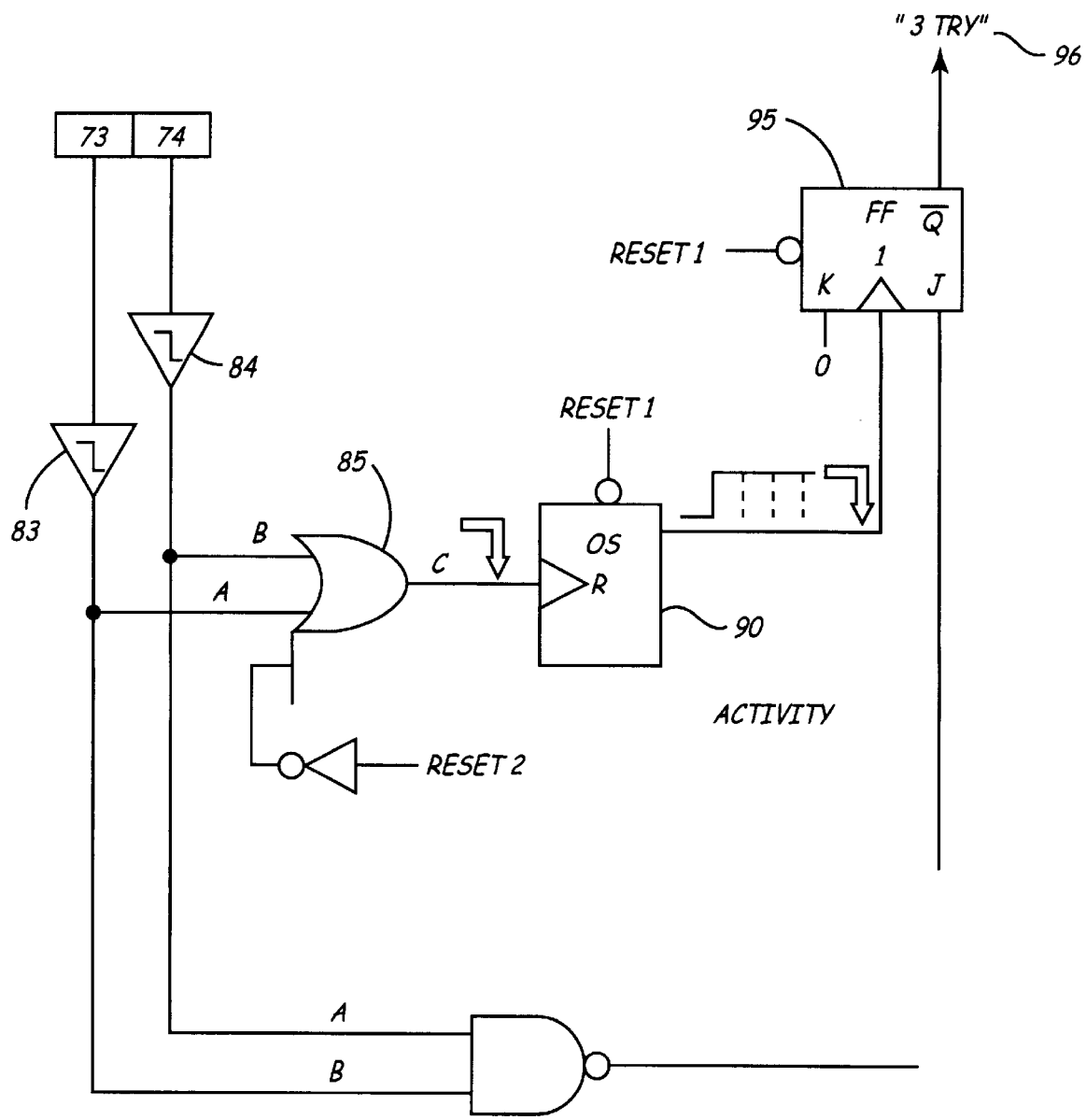
FIG. 7 is a block diagram of a control unit for a retractable LCD monitor implementing the obstruction detection system according to an embodiment of the invention.

The monitor 10 is moved by a motor shaft 14 that is rotatably driven by a motor 15. The motor 15 is under the control of a motor control circuit 50. The motor control circuit 50 commands the motor 15 to rotate the motor shaft 14 in the forward direction (FWD) when the monitor is to be moved from its stowed position to its deployed position. The details of the motor control circuit will be described with respect to FIG. 7.

Figure 4:
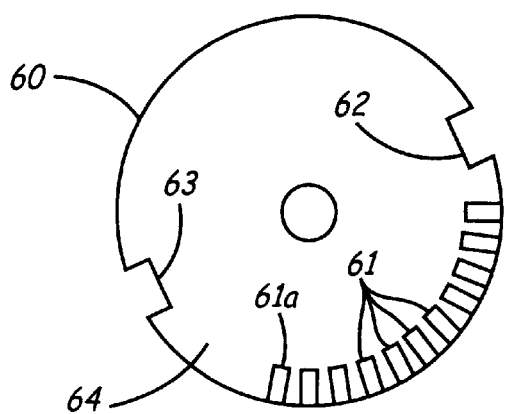
FIG. 4 illustrates an encoder disc that is employed in the obstruction detection system according to an embodiment of the invention.

An encoder disc or wheel 60, illustrated in FIG. 4, is mounted on the motor shaft 14 to be in rotation with the monitor 10, so that as the monitor 10 is rotated by the motor shaft 14, the disc 60 rotates with the same rotational velocity and by the same angle. The disc 60 has a plurality of slits 61, a beginning slot 62, and an ending slot 63 formed on its outer periphery. The slits 61 and the slots 62, 63 are arranged so that the slits 61 correspond to intermediate positions of the monitor 10, the beginning slot 62 to the stowed position of the monitor 10, and the ending slot 63 to the monitor position slightly prior to and at the deployed position.

Figure 5:
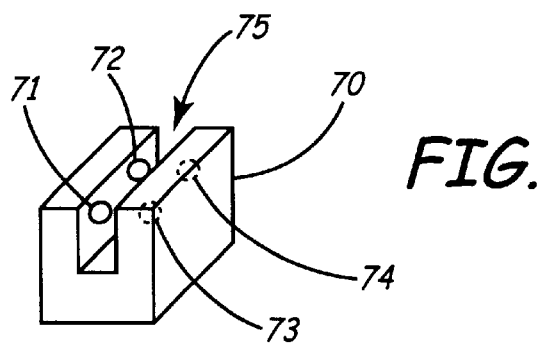
FIG. 5 illustrates a dual-section optical switch that is used in conjunction with the encoder disc of FIG. 4 in the obstruction detection system according to an embodiment of the invention.

A dual-section optical sensor or switch 70, illustrated in FIG. 5, has a base and a pair of sidewalls defining a channel 75. A pair of light sources 71, 72, e.g., light emitting diodes (LEDs), are provided on one sidewall and a matching pair of photodetectors 73, 74, e.g., phototransistors, are provided on the other, opposing sidewall. When the optical switch 70 is operating, the light sources 71, 72 shoot corresponding light beams across the channel 75 to a matching photodetector 73, 74 located on the opposing sidewall.

In operation, the optical switch 70 is held stationary and the outer periphery of the disc 60 is positioned in the channel 75 of the optical switch 70, so that as the disc 60 rotates, the slits 61 alternately go into and out of alignment with the light beams produced by the light sources 71, 72, and an analog waveform is generated by the photodetectors 73 and 74. The analog waveforms are then converted to digital or square waveforms using comparators 83, 84 (see FIG. 7). The comparators 83, 84 produce the digital waveforms A and B, illustrated in FIG. 6A, to have a high signal when the light beam is blocked by a non-light transmissive portion of the disc's outer periphery and a low signal when the light beam is transmitted through one of the slits 71 and received by the corresponding photodetector 73 or 74.

The digital waveforms A and B are then combined using an OR gate 85 to produce a digital waveform C and the digital waveform C is supplied to a retriggerable monostable multivibrator (retriggerable one-shot) 90. The output of the retriggerable one-shot 90 is configured to be high so long as the pulses of the digital waveform C arrive at its input above a threshold rate, which is adjustable and set in accordance with how much of a decrease in the deploy rate of the monitor 10 is acceptable. Otherwise, the output of the retriggerable one-shot 90 goes low and this event triggers a flip-flop circuit 95 to generate an active, low output to a 3-try circuit 96. The 3-try circuit 96 in turn issues a command to return the monitor to its stowed position and re-attempt deployment.

The pulses of the digital waveforms A and B, which in combination make up the pulses of the digital waveform C, are generated in proportion to the deploy velocity of the monitor 10. Each pulse of the digital waveforms A and B represents a blockage of the light beam by a non-light transmissive portion of the disc 60. When the deploy velocity of the monitor 10 is reduced, e.g., by an obstruction or obstacle in the deploy path, the pulses of the digital waveforms A and B stretch out and edge trigger the retriggerable one-shot 90 at a slower rate. If the pulses arrive at the retriggerable one-shot 90 below the threshold rate, the output of the retriggerable one-shot 90 goes low and this event triggers the flip-flop circuit 95 to generate the active, low output to a 3-try circuit 96.

The monitor 10 undergoes three rotational velocity zones in moving from the stowed position to the deploy position. FIG. 8 illustrates the three zones. The first zone is the acceleration zone, in which the monitor 10 accelerates to a deploy velocity. The retriggerable one-shot 90 does not become operative until the monitor 10 nears the end of the acceleration zone. This way, the slow rate of movement at the beginning of deployment is not recognized by the retriggerable one-shot 90 as a condition requiring retraction of the monitor back to its stowed state. The monitor 10 maintains the deploy velocity in the constant velocity zone until it reaches the end of travel and enters the deployed zone. In the deployed zone, the rotational velocity of the monitor drops quickly down to zero.

The end of travel of the monitor is sensed by comparing the digital waveforms A and B. The slits in the disc 60 have been arranged such that the high outputs of the digital waveforms A and B do not overlap when the monitor 10 is in the beginning position or any of the intermediate positions. At the beginning position, the digital waveforms A and B are both low, e.g., (0, 0), and at the intermediate positions, the digital waveforms A and B take on one of three states— (0, 0), (0, 1) or (1, 0), where "0" corresponds to low and "1" corresponds to high. The only time the high outputs of the digital waveforms A and B overlap (1, 1) is when the monitor 10 has reached the end of travel—in its deployed position.

When the monitor 10 reaches near the end of travel, i.e., when the outputs of the digital waveforms A and B are both high (1, 1), the motor is held at the deployed position using an electromechanical brake, or a solenoid latch, or using a reduced torque to hold the monitor against a mechanical stop.

Alternatively, the sense of the light pulses for each digital waveform may be inverted, yielding the digital waveforms A and B, as depicted in FIG. 6B. The digital waveform (A and B) values are normally high and briefly go low, except at the deploy position where both waveforms (A and B) are simultaneously at the low value. Utilizing the normally "high", deployed "low" parameters may achieve advantages with respect to disc alignment tolerances and overall system performance.

Alternate embodiments to those described above include but are not limited to utilization of microprocessors for implementation of the one-shot functions and the logic associated therewith.

In the embodiments of the invention described above, a specially-designed disc and a dual-section optical switch are used to generate the pulse stream to be supplied to the input of the retriggerable one-shot. Any other method known in the art for generating a stream of pulses in proportion to a rotational speed may be used. Further, although an optical switch having two light sources and two photodetectors are preferred for obstruction detection, a single-section optical switch having a single light source and a single photodetector may be used, if it is only necessary to detect the angular velocity of the monitor using the circuit.

The output of the optical switch is also used to maintain the deploy velocity below a prescribed upper limit. This may done by any conventional methods, for example, by counting the number of pulses per unit time and if the deploy velocity is above the prescribed range, the current to the motor is decreased.

While particular embodiments according to the invention have been illustrated and described above, it will be clear that the invention can take a variety of forms and embodiments within the scope of the appended claims.

We claim:

1. A method of detecting an obstruction along a path traversed by a moving object, comprising the steps of:
   generating a stream of pulses in accordance with a speed of the object;
   continuously monitoring the stream of pulses; and
   generating a signal to indicate a presence of the obstruction when the pulses are generated at a rate that is slower than a predetermined rate.

2. The method according to claim 1, wherein the step of continuously monitoring includes the step of detecting edge triggers in the stream of pulses.

3. The method according to claim 2, wherein the signal comprises a high-to-low transition signal.

4. The method according to claim 1, wherein the steps of continuously monitoring and generating are carried out using a retriggerable monostable multivibrator.

5. A method of detecting an obstruction along a path traversed by a moving object, comprising the steps of:
   generating a stream of first pulses in accordance with a speed of the object;
   generating a steam of second pulses in accordance with the speed of the object;
   combining the first and second pulses to produce a stream of first and second pulses;
   continuously monitoring the combined the stream of first and second pulses; and
   generating a signal to indicate a presence of the obstruction when the first and second pulses are generated at a rate that is slower than a predetermined rate.

6. The method according to claim 5, wherein the step of continuously monitoring includes the step of detecting edge triggers in the stream of first and second pulses.

7. The method according to claim 6, wherein the signal comprises a high-to-low transition signal.

8. The method according to claim 5, wherein the steps of continuously monitoring and generating are carried out using a retriggerable monostable multivibrator.

9. In a retractable display system having a display panel that is moved from a stowed position to an operative position by a motor, a method of detecting an obstruction as the display panel is moved from the stowed position to the operative position, said method comprising the steps of:
   generating an alternating signal representative of a deploy velocity of the display panel;
   detecting edge triggers in the alternating signal; and
   comparing a rate of edge trigger detection with a threshold rate and releasing the motor when the rate of edge trigger detection is lower than the threshold rate.

10. The method according to claim 9, wherein the retractable display system includes an optical sensor having a photodetector and a light source producing a light beam directed at the photodetector, and a disc that moves with the display panel, the disc having a plurality of light transmissive portions arranged to move into and out of a light beam axis of the light source, and wherein the alternating signal is generated as the light transmissive portions move into and out of the light beam axis.

11. The method according to claim 9, wherein the step of generating includes the steps of:
   generating a stream of first pulses in accordance with the deploy velocity;
   generating a stream of second pulses in accordance with the deploy velocity; and
   combining the stream of first and second pulses to produce the alternating signal.

12. The method according to claim 11, wherein the alternating signal is produced by performing a logical OR operation on the stream of first and second pulses.

13. The method according to claim 12, wherein the retractable display system includes an optical sensor having a pair of photodetectors and a pair of corresponding light sources each producing a light beam directed at a corresponding one of the photodetectors, and a disc that moves with the display panel, the disc having a plurality of light transmissive portions arranged to move into and out of light beam axes of the light sources, and wherein the alternating signal is generated as the light transmissive portions move into and out of the light beam axes.

14. The method according to claim 13, wherein the stream of first pulses are generated when the light transmissive portions move into and out of a first one of the light beam axes and the stream of second pulses are generated when the light transmissive portions move into and out of a second one of the light beam axes.

15. The method according to claim 9, wherein the step of comparing is carried out using a retriggerable monostable multivibrator.

16. A control system for a retractable panel driven from a stowed position to an operating position by a motor, comprising:

a sensor producing a stream of pulses in accordance with a velocity of the panel; and a control circuit for the motor, the control circuit receiving the stream of pulses and commanding the motor to stop driving the panel when the pulses are received at a rate that is slower than a predetermined rate.

17. The control system according to claim 16, wherein the control circuit includes a retriggerable monostable multivibrator for determining whether the pulses are received at a rate that is slower than the predetermined rate.

18. The control system according to claim 17, wherein the sensor includes an optical sensor having a photodetector and a light source producing a light beam directed at the photodetector, the optical sensor producing a pulse when the light beam is blocked from the photodetector but not when the light beam is sensed by the photodetector.

19. The control system according to claim 18, further comprising a disc having a plurality of light transmissive portions, the light transmissive portions being aligned with the optical sensor to move into and out of the light beam axis as the panel is driven by the motor, such that the optical sensor produces a pulse when the light beam is blocked from the photodetector by a non-light transmissive portion of the disc and the optical sensor does not produce a pulse when the light beam is transmitted through one of the light transmissive portions and sensed by the photodetector.

20. The control system according to claim 17, wherein the sensor comprises first and second outputs, the first output generating a stream of first pulses and the second output generating a stream of second pulses and the stream of first pulses and the stream of second pulses are combined to produce said stream of pulses.

21. The control system according to claim 20, further comprising an optical sensor having first and second photodetectors and corresponding first and second light sources each producing a light beam directed at the corresponding photodetector, and a disc that moves with the panel, the disc having a plurality of light transmissive portions arranged to move into and out of light beam axes of the light sources, such that the optical sensor produces a first pulse when the light beam produced by the first light source is blocked from the corresponding photodetector by a non-light transmissive portion of the disc and the optical sensor does not produce a first pulse when the light beam produced by the first light source is transmitted through one of the light transmissive portions and sensed by the corresponding photodetector, and such that the optical sensor produces a second pulse when the light beam produced by the second light source is blocked from the corresponding photodetector by a non-light transmissive portion of the disc and the optical sensor does not produce a second pulse when the light beam produced by the second light source is transmitted through one of the light transmissive portions and sensed by the corresponding photodetector.

22. The control system according to claim 21, further comprising a logical OR gate for combining the streams of first and second pulses.

23. The control system according to claim 22, wherein the control circuit includes a retriggerable monostable multivibrator for determining whether the pulses are received at a rate that is slower than the predetermined rate.

* * * * *